(12) United States Patent
Matsuki

(10) Patent No.: US 11,678,294 B2
(45) Date of Patent: Jun. 13, 2023

(54) OPERATION MANAGEMENT METHOD, OPERATION MANAGEMENT DEVICE, AND OPERATION MANAGEMENT PROGRAM

(71) Applicant: KDDI CORPORATION, Tokyo (JP)

(72) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 197 days.

(21) Appl. No.: 16/641,428

(22) PCT Filed: Mar. 9, 2018

(86) PCT No.: PCT/JP2018/009300
§ 371 (c)(1),
(2) Date: Feb. 24, 2020

(87) PCT Pub. No.: WO2019/064636
PCT Pub. Date: Apr. 4, 2019

(65) Prior Publication Data
US 2021/0144671 A1     May 13, 2021

(30) Foreign Application Priority Data
Sep. 26, 2017 (JP) .............................. JP2017-185047

(51) Int. Cl.
*H04W 64/00* (2009.01)
*G08G 5/00* (2006.01)
(Continued)

(52) U.S. Cl.
CPC .......... *H04W 64/006* (2013.01); *G08G 5/003* (2013.01); *G08G 5/0004* (2013.01);
(Continued)

(58) Field of Classification Search
None
See application file for complete search history.

(56) References Cited

U.S. PATENT DOCUMENTS 8,788,118 B2 * 7/2014 Matos .................... G05D 1/042
                                                          701/2
8,903,568 B1 * 12/2014 Wang .................... G05D 1/0038
                                                          701/2
(Continued)

FOREIGN PATENT DOCUMENTS

CN     104750111 A    7/2015
CN     105206114 A   12/2015
(Continued)

OTHER PUBLICATIONS

Office Action issued in corresponding Chinese Patent Application No. 201880055418.9 dated Aug. 4, 2021 with English translation.
(Continued)

*Primary Examiner* — Ajit Patel
*Assistant Examiner* — Liem H. Nguyen
(74) *Attorney, Agent, or Firm* — Foley & Lardner LLP

(57) ABSTRACT

An operation management device is configured to acquire a subscriber ID to identify a subscriber joining a service using a mobile telephone line from a mobile terminal over the mobile telephone line, to acquire the position information representing the position of a flight device, which the mobile terminal acquires from the flight device before or during its flight over a wireless communication line different from the mobile telephone line, from the mobile terminal over the mobile telephone line, and to acquire a device ID to identify the flight device from the mobile terminal over the mobile telephone line.

4 Claims, 8 Drawing Sheets

(51) Int. Cl.
*H04W 4/60* (2018.01)
*H04W 4/80* (2018.01)

(52) U.S. Cl.
CPC .............. *H04W 4/60* (2018.02); *H04W 4/80* (2018.02); *H04W 64/003* (2013.01)

(56) References Cited

U.S. PATENT DOCUMENTS

| | | | |
|---|---|---|---|
| 9,412,278 B1* | 8/2016 | Gong | G06F 8/65 |
| 9,489,852 B1* | 11/2016 | Chambers | G08G 5/0069 |
| 10,034,209 B1* | 7/2018 | Nandan | H04B 7/18504 |
| 10,038,492 B2* | 7/2018 | Gong | H04B 7/18506 |
| 10,140,874 B2* | 11/2018 | Yang | B64C 39/024 |
| 10,472,091 B2* | 11/2019 | Irish | G08G 1/205 |
| 2016/0240087 A1* | 8/2016 | Kube | G08G 5/006 |
| 2017/0012697 A1* | 1/2017 | Gong | B64C 39/024 |
| 2017/0024746 A1* | 1/2017 | Henry | G06Q 30/018 |
| 2017/0127245 A1* | 5/2017 | Adkins | B64C 39/024 |
| 2017/0134699 A1 | 5/2017 | Kim et al. | |
| 2017/0206648 A1* | 7/2017 | Marra | G01C 11/00 |
| 2017/0278410 A1* | 9/2017 | Byers | H04W 84/06 |
| 2018/0047295 A1* | 2/2018 | Ricci | G01S 5/0263 |
| 2018/0141676 A1* | 5/2018 | Suzuki | B64C 39/024 |
| 2018/0165971 A1* | 6/2018 | Chen | G08G 5/0039 |
| 2018/0307907 A1* | 10/2018 | Ichihara | G06V 20/10 |
| 2018/0323862 A1* | 11/2018 | Gong | H04W 16/18 |
| 2019/0019418 A1* | 1/2019 | Tantardini | G08G 5/0026 |
| 2019/0114925 A1* | 4/2019 | Schulman | G08G 5/0082 |
| 2019/0135434 A1* | 5/2019 | Zhang | G06F 8/65 |
| 2019/0278897 A1* | 9/2019 | Zhang | G06F 21/604 |
| 2020/0020236 A1* | 1/2020 | Zhou | G08G 5/006 |
| 2020/0154426 A1* | 5/2020 | Takács | H04W 28/26 |
| 2020/0205211 A1* | 6/2020 | Hong | H04W 8/08 |
| 2020/0219408 A1* | 7/2020 | Han | G08G 5/006 |
| 2021/0035454 A1* | 2/2021 | Mader | G05D 1/101 |
| 2021/0043096 A1* | 2/2021 | Brown | H04B 7/18506 |
| 2021/0150914 A1* | 5/2021 | Yamada | G01C 21/26 |

FOREIGN PATENT DOCUMENTS

| | | | | |
|---|---|---|---|---|
| JP | 2004-096267 A | 3/2004 | | |
| JP | 2007-180886 A | 7/2007 | | |
| JP | 2016-051268 A | 4/2016 | | |
| JP | 2016-071404 A | 5/2016 | | |
| JP | 2016-173722 A | 9/2016 | | |
| JP | 2016-225983 A | 12/2016 | | |
| JP | 2017-117017 A | 6/2017 | | |
| JP | 101780479 B1 * | 6/2017 | | |
| JP | 6174290 B1 | 8/2017 | | |
| KR | 20170045638 A * | 4/2017 | ........... | G08G 5/0013 |
| WO | WO 2016/171222 A1 | 10/2016 | | |
| WO | WO-2018199361 A1 * | 11/2018 | | |

OTHER PUBLICATIONS

International Search Report issued in corresponding PCT Application No. PCT/JP2018/009300 dated Jun. 12, 2018 with English translation.
CN Notice of Allowance issued in corresponding Chinese Application No. 201880055418.9, dated Jul. 27, 2022, with partial translation (7 pages).

* cited by examiner

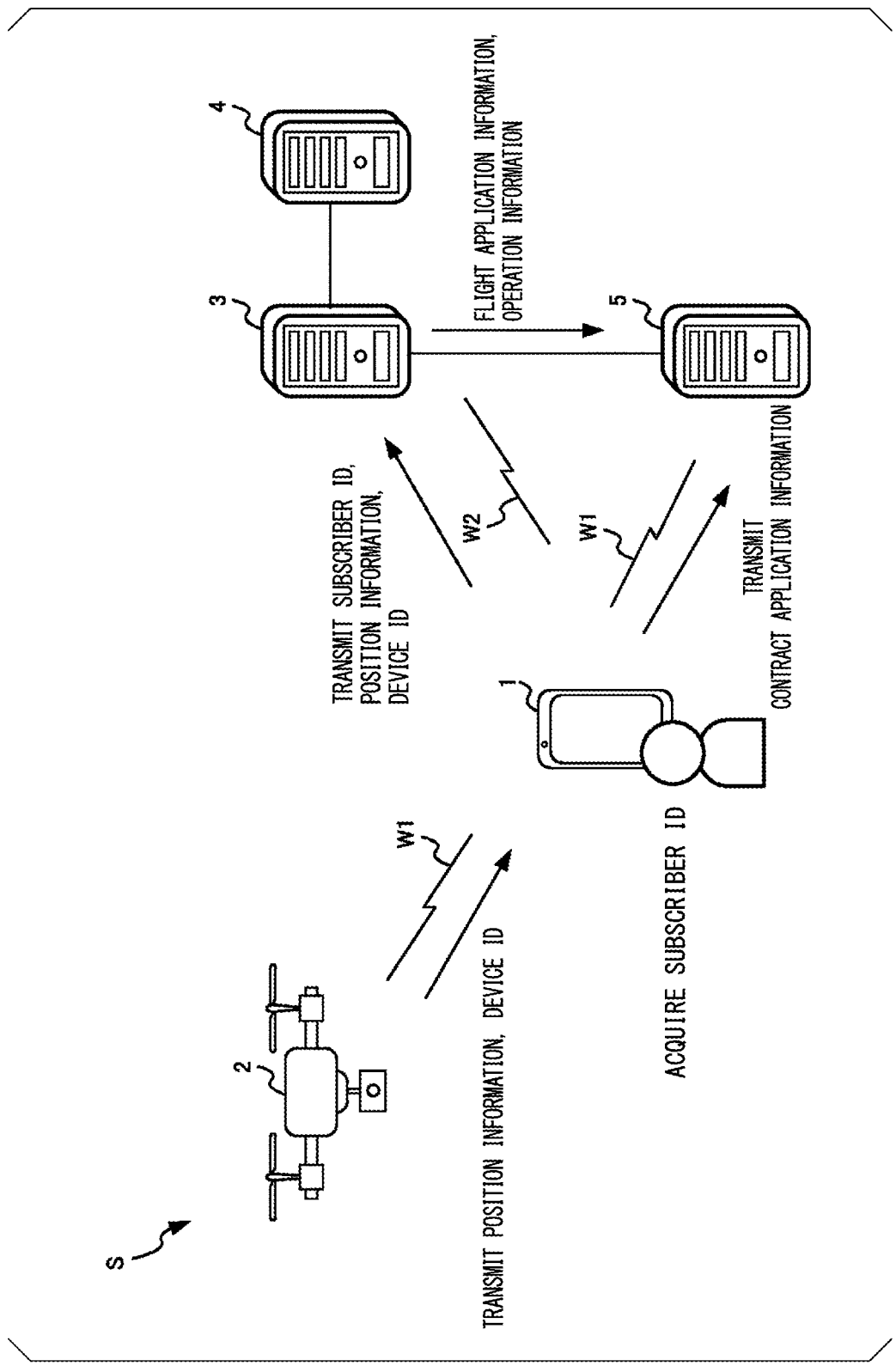

OPERATION MANAGEMENT METHOD, OPERATION MANAGEMENT DEVICE, AND OPERATION MANAGEMENT PROGRAM

The present application claims the benefit of priority on Japanese Patent Application No. 2017-185047 filed on Sep. 26, 2017, the subject matter of which is hereby incorporated herein by reference.

TECHNICAL FIELD

The present invention relates to an operation management method, an operation management device, and an operation management program.

BACKGROUND ART

Conventionally, in order to carry out a flight with flight devices such as drones, flight devices have been controlled to fly according to flight routes applied in advance (e.g. Patent Document 1).

CITATION LIST

Patent Literature Document

Patent Document 1: Japanese Patent Application Publication No. 2016-173722

SUMMARY OF INVENTION

Technical Problem

To manage a flight device regarding whether to actually fly according to an application, an operation management device should acquire the position information representing the position of a flight device and the identification information to identify the flight device during its flight time. However, the conventional technology fails to disclose any methods for an operation management device to acquire the above information during a flight time; hence, it is necessary to provide a method for the operation management device to acquire the above information.

The present invention is made in consideration of the aforementioned deficiencies, and therefore the present invention aims to provide an operation management method, an operation management device, and an operation management program, which can acquire the position information representing the position of a flight device and the identification information to identify the flight device during its flight time.

Solution to Problem

In a first aspect of the present invention, an operation management method includes the steps of: acquiring, by an operation management device, the subscriber identification information to identify a subscriber joining a service using a mobile telephone line from a communication terminal over the mobile telephone line; acquiring, by the operation management device, the position information representing the position of a flight device, which the communication terminal acquires from the flight device before or during its flight over a wireless communication line different from the mobile telephone line, from the communication terminal over the mobile telephone line; and acquiring, by the operation management device, the flight-device identification information to identify the flight device from the communication terminal over the mobile telephone line.

The operation management method may further include the step of storing, by the operation management device, the flight application information representing a flight application of the flight device on a storage before acquiring the subscriber identification information, the position information, and the flight-device identification information from the communication terminal, wherein the flight application information may include the subscriber information, the flight-device identification information, and information indicating a flight date/time and a flight area of the flight device.

The operation management method may further include the step of making an authentication, by the operation management device, as to whether or not the subscriber identification information, the position information, and the flight-device identification information acquired from the communication terminal comply with the flight application information stored on the storage.

The operation management method may further include the step of transmitting, by the operation management device, the permit information to permit the flight of the flight device due to a success of authentication to the flight device.

The operation management method may further include the step of transmitting, by the operation management device, the subscriber identification information acquired from the communication terminal to a management apparatus managed by a common carrier providing a service using the mobile telephone line, and the step of acquiring, by the operation management device, the information relating to the subscriber having the subscriber identification information from the management apparatus.

The operation management method may further include the step of transmitting, by the operation management device, the subscriber identification information to a charging management apparatus in order to charge the subscriber having the subscriber identification information received from the communication terminal for the flight of the flight device.

According to the operation management method, in the step of acquiring the position information, the communication terminal may acquire the position information from the flight device, which precludes a communication part configured to make a communication over the mobile telephone line, over the wireless communication line, while the operation management device may acquire the position information from the communication terminal over the mobile telephone line.

It is possible to provide a plurality of flight devices, wherein, in the step of acquiring the position information, the operation management device may acquire the position information, representing the position of each of the plurality of flight devices, from each of the plurality of flight devices in connection with the subscriber identification information, and wherein, in the step of acquiring the flight-device identification information, the operation management device may acquire the flight-device identification information for each of the plurality of flight devices in connection with the subscriber identification information.

In a second aspect of the present invention, an operation management method includes the steps of: storing, by the operation management device, the subscriber identification information to identify a subscriber joining a service using a mobile telephone line, the flight-device identification information to identify a flight device to be used by the subscriber, and the flight application information associated with information representing a flight date/time and a flight area of the flight device on a storage: acquiring, by the operation management device. the flight-device identification information to identify the flight device and the position information representing a position of the flight device from a communication terminal utilized by the subscriber over the mobile telephone line before or during a flight of the flight device; making an authentication, by the operation management device, as to whether or not the flight-device identification information and the position information acquired by the communication terminal comply with the flight application information stored on the storage; and transmitting, by the operation management device, an authentication result to the communication terminal over the mobile telephone line.

The step of acquiring the position information may further include a step of acquiring the position information from the flight device over a wireless communication line different from the mobile telephone line by the communication terminal and a step of acquiring the position information by the operation management device via the communication terminal.

In a third aspect of the present invention, an operation management device includes an operation information acquisition part configured to acquire the subscriber identification information to identify a subscriber joining a service using a mobile telephone line from a communication terminal over the mobile telephone line, to acquire the position information representing a position of a flight device, which the communication terminal acquires from a flight device before or during its flight over a wireless communication line different from the mobile telephone line, from the communication terminal over the mobile telephone line, and to acquire the flight-device identification information to identify the flight device from the communication terminal over the mobile telephone line.

In a fourth aspect of the present invention, an operation management program causes a computer to serve as an operation information acquisition part configured to acquire the subscriber identification information to identify a subscriber joining a service using a mobile telephone line from a communication terminal over the mobile telephone line, to acquire the position information representing a position of a flight device, which the communication teminal acquires from a flight device before or during its flight over a wireless communication line different from the mobile telephone line, from the communication terminal over the mobile telephone line, and to acquire the flight-device identification information to identify the flight device from the communication teiminal over the mobile telephone line.

Advantageous Effects of Invention

According to the present invention, it is possible to produce an effect to acquire the position information representing the position of a flight device and the identification information to identify the flight device during its flight time.

BRIEF DESCRIPTION OF DRAWINGS

FIG. 8 is a schematic diagram showing the configuration of an operation management system according to the fourth embodiment.

DESCRIPTION OF EMBODIMENTS

First Embodiment

[Outline of Operation Management System S]

Figure 1:
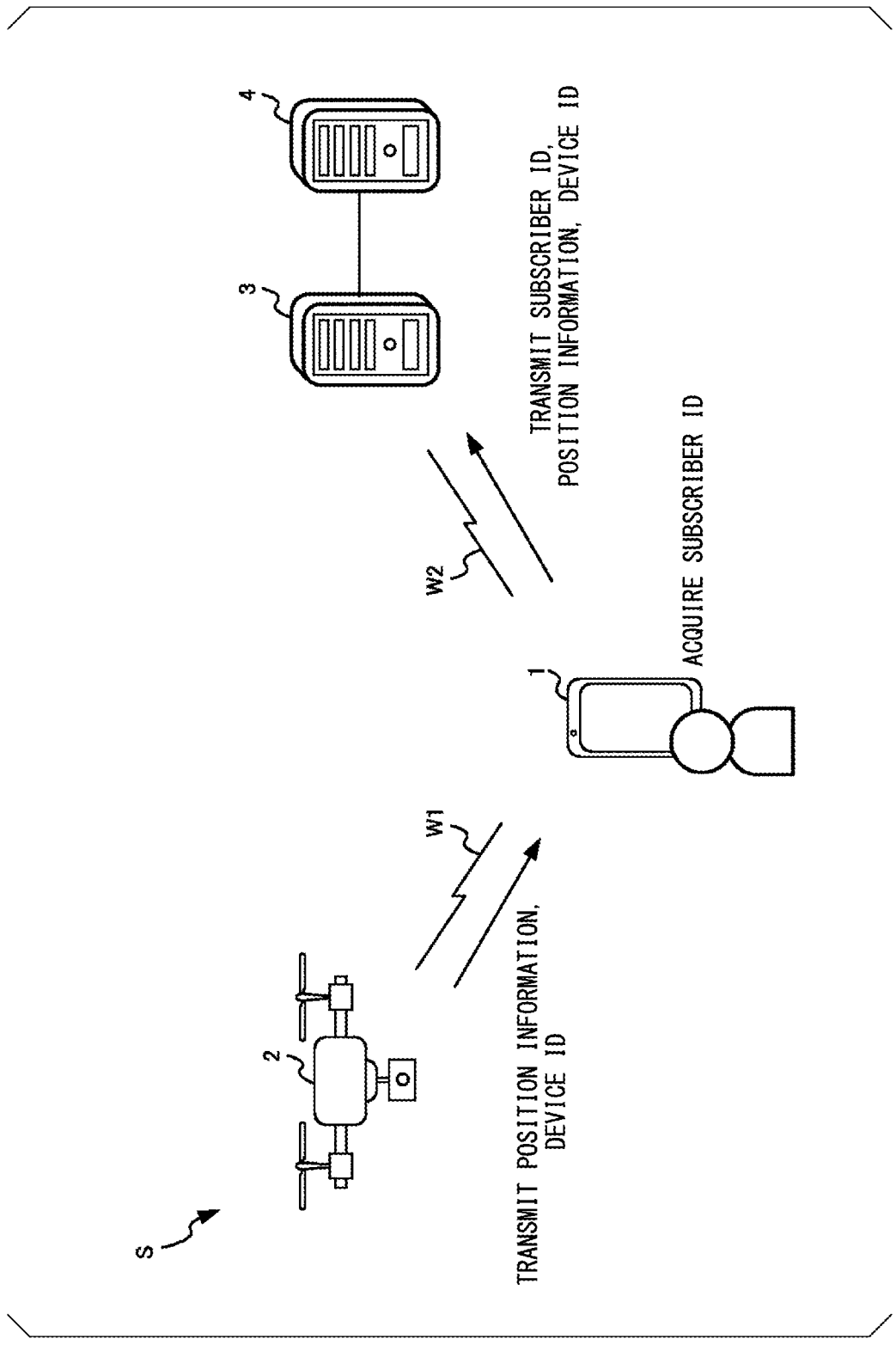
FIG. 1 is a schematic diagram showing the configuration of an operation management system according to the first embodiment.

FIG. 1 shows the outline of an operation management system S according to the first embodiment. The operation management system S is configured to manage an operation of a flight device 2 over communications between a mobile teiininal 1 serving as a communication terminal, the flight device 2, an operation management device 3, and a management apparatus 4. The mobile terminal 1 is a communication terminal configured to communicate with external devices over a wireless communication line WI using unlicensed bands for Wi-Fi (a registered trademark), Bluetooth (a registered trademark), and Zigbee (a registered trademark) and a mobile phone line W2 using licensed bands for LTE (Long Term Evolution), 3G, 4G, and 5G. For example, the mobile terminal 1 may be a smartphone, a tablet, or a wearable terminal.

The present embodiment is described with respect to a communication terminal corresponding to the mobile terminal 1; however, the communication terminal may be configured of various types of mobile bodies having communication functions (e.g. automobiles or flight devices).

The flight device 2 may be any device such as a drone which can be utilized by a user holding the mobile terminal 1. The operation management device 3 is a server configured to manage the operation of the flight device 2.

The management apparatus 4 is a server managed by a communication carrier providing services using the mobile phone line W2; hence, the management apparatus 4 is configured to manage the information of subscribers receiving the provided services.

When a user starts a flight with the flight device 2, the mobile terminal 1 acquires from a media attached to a user's body a subscriber ID to identify a subscriber joining services using the mobile phone line W2. Herein, the mobile phone 1 may be equipped with a media such as a SIM (Subscriber Identity Module) card.

Using the wireless communication line WI, the mobile terminal 1 acquires from the flight device 2 the position information representing the position of the flight device 2 and a device ID serving as the flight-device identification information to identify the flight device 2. The mobile terminal 1 transmits the operation information, which includes the subscriber ID, the device ID, and the position information, to the operation management device 3 over the mobile phone line W2.

Upon receiving the operation information from the mobile terminal 1, the operation management device 3 authenticates whether or not the content of a flight application, which is indicated by the flight application information of the flight device 2 stored in advance, matches the data of the operation information. Due to a failure of an authentication, the operation management device 3 acquires the information relating to a subscriber having the subscriber ID from the management apparatus 4. The operation management device 3 outputs the alarm information including the information relating to a subscriber and indicating an improper flight of the flight device 2.

As described above, in the operation management system S, it is possible for the operation management device 3 to acquire the position information representing the position of the flight device 2 and the device ID to identify the flight device 2 during a flight time of the flight device 2. Accordingly, it is possible for the operation management device 3 to manage whether the flight device 2 makes a flight based on a flight application since the device ID was acquired at a flight application of the flight device 2 in advance and associated with the flight content.

Hereinafter, the configurations of the mobile terminal 1, the flight device 2, and the operation management device 3 will be described below.

[Configuration of Mobile Terminal 1]

Figure 2:
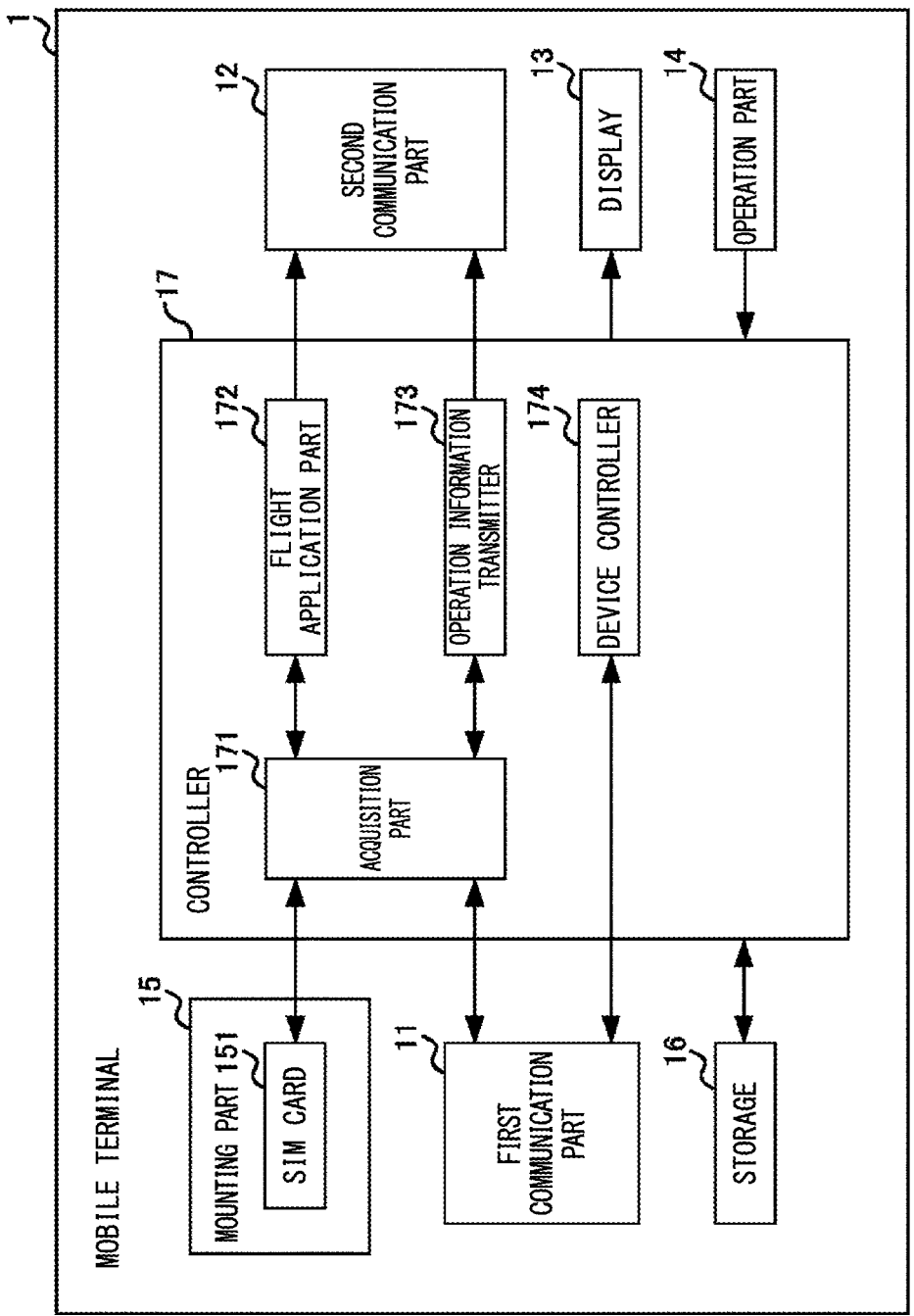
FIG. 2 is a block diagram showing the configuration of a mobile terminal according to the first embodiment.

FIG. 2 shows the configuration of the mobile terminal 1 according to the first embodiment. The mobile terminal 1 includes a first communication part 11, a second communication part 12, a display 13, an operation part 14, a mounting part 15, a storage 16, and a controller 17.

The first communication part 11 is a communication module configured to transmit or receive radio waves for communication over the wireless communication line W1. The first communication part 11 includes a modulator configured to modulate transmission data input by the controller 17 and a high-frequency part configured to transmit the modulated data as high-frequency signals. In addition, the first communication part 11 includes a demodulator configured to modulate high-frequency signals from the flight device 2 received by the high-frequency part. The demodulator sends the demodulated reception data to the controller 17.

The second communication part 12 is a communication module configured to transmit or receive radio waves over the mobile phone line W2. The second communication part 12 includes a modulator configured to modulate transmission data input by the controller 17 and a high-frequency part configured to transmit the modulated data as high-frequency signals. In addition, the second communication part 12 includes a demodulator configured to demodulate high-frequency signals from the operation management device 3 which are received by the high-frequency part over the mobile phone line W2. The demodulator sends the demodulated reception data to the controller 17.

The display 13 is a display configured to display the necessary information for a user to control the flight device 2. The display 13 is configured to display the display information input by the controller 17.

For example, the operation part 14 is configured of a touch panel attached to the surface of the display 13. The operation part 14 accepts a user operation to transmit the operation information including the subscriber ID, the device ID and the position information of the flight device 2 to the operation management device 3 and a user operation to control the fight device 2. The operation part 14 notifies the controller 17 of a signal representing the content of a user operation.

The mounting part 15 is configured to mount a SIM card 151. The SIM card 151 stores the subscriber ID to identify a subscriber joining services using the mobile phone line W2. The subscriber ID is read by the controller 17 and used for communication of the second communication part 12 and the operation management of the flight device 2.

The storage 16 is a storage media including a ROM (Read-Only Memory), a RAM (Random-Access Memory), or the like. The storage 16 stores a flight management program to be executed by the controller 17.

For example, the controller 17 is configured of a CPU (Central Processing Unit). The controller 17 executes the flight management program stored on the storage 16 to achieve the functions of an acquisition part 171, a flight application part 172, an operation info'ination transmitter 173, and a device controller 174.

The acquisition part 171 is configured to acquire various pieces of information under the control over the flight application part 172 or the operation information transmitter 173. Specifically, the acquisition part 171 acquires the subscriber ID from the SIM card 151 mounted on the mounting part 15.

Under the control of the flight application part 172 or the operation information transmitter 173, the acquisition part 171 acquires the device ID to identify the flight device 2 from the flight device 2 over the wireless communication line W1. Upon receiving the device ID from the flight device 2, the acquisition pan 171 may store the device ID on the storage 16. Subsequently, the acquisition part 171 may acquire the device ID stored on the storage 16 under the control of the flight application part 172 or the operation information transmitter 173. In this connection, the acquisition part 171 may acquire the device ID when receiving an input operation from the operation part 14.

In addition, the acquisition part 171 may acquire the position information representing the position of the flight device 2 from the flight device 2 over the wireless communication line W1 under the control of the operation information transmitter 173.

Upon receiving the information representing the content of a flight application of the flight device 2 made by a user of the mobile terminal 1, the flight application part 172 transmits the flight application information including its content to the operation management device 3 via the second communication part 12. Specifically, the flight application part 172 displays a flight application screen to accept the content of a flight application when accepting an operation to make a flight application. The flight application part 172 receives the content of a flight application, i.e. the information representing the flight date/time of the flight device 2 and a flight area of the flight device 2 (including at least one of a flight start position, a flight destination, and a flight route based on the flight start position and the flight destination).

In addition, the flight application part 172 controls the acquisition part 171 to acquire the device ID to identify the flight device 2 from the flight device 2. The flight application part 172 controls the acquisition part 171 to acquire the subscriber ID from the SIM card mounted on the mounting part 15.

The flight application part 172 transmits to the operation management device 3 the flight application information representing a flight application of the flight device 2 and including the subscriber ID, the device ID, and the information representing the input flight content.

Before a flight of the flight device 2, i.e. to start a flight with the flight device 2, the operation information transmitter 173 transmits the operation information including the subscriber ID, the device ID, and the position information to the operation management device 3 over the mobile telephone line W2. Specifically, when the operation part 14 receives an operation to start a flight with the flight device 2, the operation information transmitter 173 controls the acquisition part 171 to acquire the device ID to identify the flight device 2 and the position information representing the position of the flight device 2 from the flight device 2. The operation information transmitter 173 controls the acquisition part 171 to acquire the subscriber ID stored on the SIM card 151.

Upon acquiring the subscriber ID, the device ID. and the position information, the operation information transmitter 173 transmits the operation information including those data to the operation management device 3. When a session is established in a communication between the mobile terminal 1 and the operation management, device 3, the operation information transmitter 173 may transmit the subscriber ID, the device ID and the position information at different timings.

Upon receiving the operation information, the operation management device 3 compares the operation information with the flight application information, which was received in advance, to authenticate the flight device 2 whether to fly according to its flight application. Upon successfully authenticating the flight device 2, the operation management device 3 transmits the flight-permit information to permit a flight of the flight device 2 to the mobile terminal 1.

When the operation information transmitter 173 receives the permission information from the operation management device 3, the device controller 174 starts a flight control to control a flight of the flight device 2. Accordingly, the flight device 2 may start to fly in the air.

Thereafter, the operation information transmitter 173 controls the acquisition part 171 to periodically acquire the device ID and the position information every predetermined time or at a predetermined timing from the flight device 2 during its flight time. Upon acquiring the device ID and the position information, the operation information transmitter 173 automatically transmits the operation information, which includes the device ID and the position information as well as the subscriber ID retrieved from the SIM card 151, to the operation management device 3 over the mobile telephone line W2. In this connection, the operation information transmitter 173 may transmit the operation information to the operation management device 3 when the operation part 14 receives a transmission operation of the operation information. Alternatively, the operation information transmitter 173 may transmit the operation information to the operation management device 3 when receiving an acquisition request of the operation information from the operation management device 3.

The device controller 174 carries out a flight control over the flight device 2 when the mobile terminal 1 receives the flight-permit information from the operation management device 3. When the operation part 14 receives an operation to make a flight control, the device controller 174 transmits the flight-control information to the flight device 2 to carry out its flight control. When the operation part 14 receives an operation to make an imaging instruction with the flight device 2, the device controller 174 transmits the imaging instruction information to the flight device 2 to capture images.

In the present embodiment, the mobile terminal 1 is configured to transmit the flight-control information to the flight device 2; but this is not a restriction. For example, a specially-designed controller (unillustrated here) configured to carry out a flight control over the flight device 2 over the wireless communication line W1 may transmit the flight-control information to the flight device 2. In this case, the specially-designed controller may receive from the mobile terminal 1 the fight-permit information transmitted by the operation management device 3. Upon receiving the flight-permit information, the specially-designed controller may carry out a flight control over the flight device 2.

[Configuration of Flight Device 2]

Figure 3:
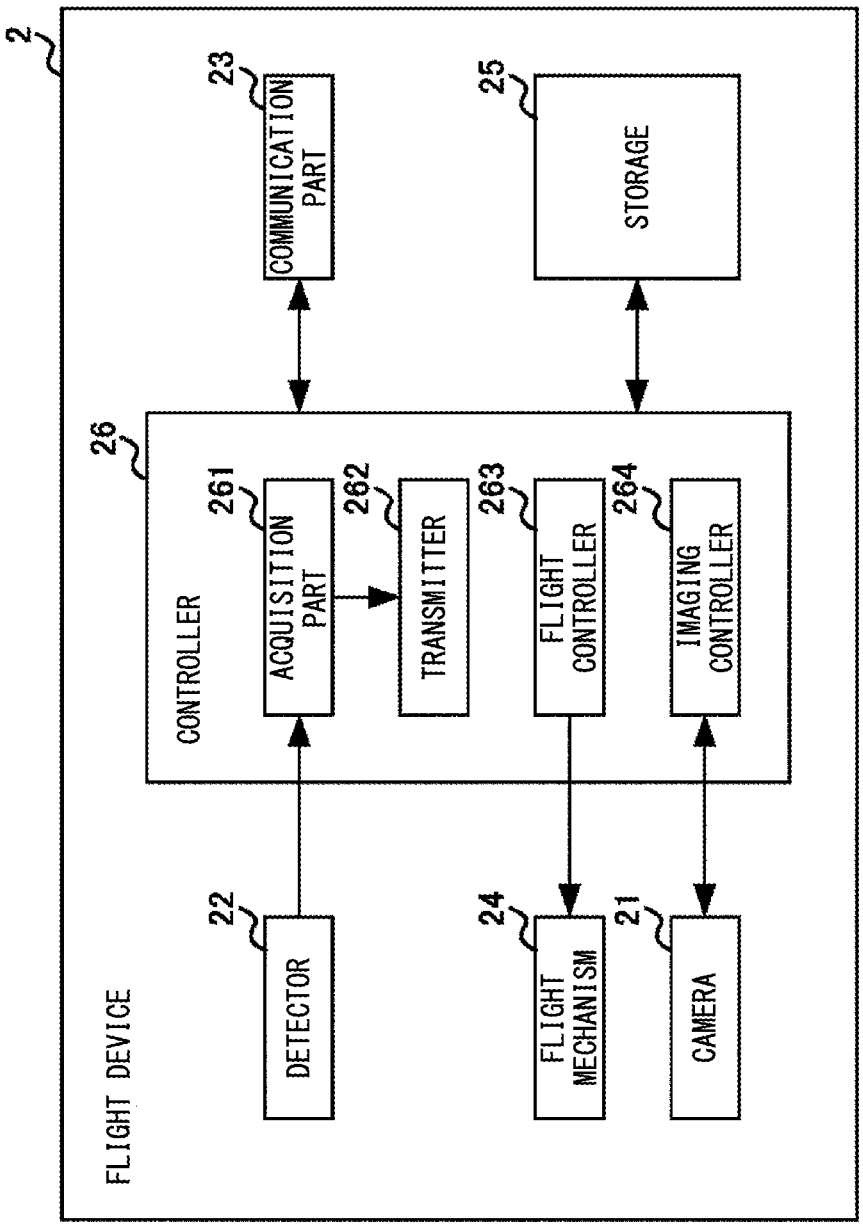
FIG. 3 is a block diagram showing the configuration of a flight device according to the first embodiment.

FIG. 3 shows the configuration of the flight device 2 according to the first embodiment. The flight device 2 includes a camera 21 serving as an imaging part, a detector 22, a communication part 23, a flight mechanism 24, a storage 25, and a controller 26. The controller 26 further includes an acquisition part 261, a transmitter 262, a flight controller 263, and an imaging controller 264. The flight device 2 starts its operation when receiving an operation-start instruction via the mobile terminal 1.

The camera 21 is configured to capture the periphery of the flight device 2 to generate a captured image. The camera 21 outputs the captured image to the controller 26.

For example, the detector 22 includes a GPS (Global Positioning System) receiver, and therefore the detector 22 is configured to generate the position information representing the position of the flight device 2 according to radio waves received from a GPS satellite. The position information may include the time information representing the time to acquire the flight position of the flight device 2. The detector 22 outputs the position information to the acquisition part 261.

The communication part 23 is a communication module configured to transmit or receive radio waves during a communication over the wireless communication line W1; hence, the communication part 23 has the same function as the first communication part 11.

The flight mechanism 24 includes propellers, a motor to rotate propellers, a rudder, and the like. The flight mechanism 24 may move the flight device 2 by operating those mechanics under the control of the flight controller 263.

The storage 25 is configured of storage media including a ROM and a RAM. The storage 25 stores programs executed by the controller 26. The storage 25 stores control programs to achieve the functions of an acquisition part 261, a transmitter 262. a flight controller 263, and an imaging controller 264 in the flight device 2. In addition, the storage 25 may store images captured by the camera 21. Moreover, the storage 25 may store the device ID to identify the flight device 2.

For example, the controller 26 is configured of a CPU. The controller 26 executes control programs stored on the storage 25 to achieve the functions of the acquisition part 261, the transmitter 262, the flight controller 263, and the imaging controller 264.

The acquisition part 261 is configured to acquire the position information representing the position of the flight device 2 from the detector 22 every predetermined time or at a predetermined timing. In addition, the acquisition part 261 is configured to acquire the device ID stored on the storage 25 every predetermined time or at a predetermined timing.

The transmitter 262 is configured to transmit the position information representing the position of the flight device 2 and the device ID to identify the flight device 2 every predetermined time or at a predetermined timing.

The flight controller 263 may move the flight device 2 by controlling the flight mechanism 24. Specifically, upon receiving the flight-control information from the mobile terminal 1, the flight controller 263 may move the flight device 2 by controlling the flight mechanism 24 according to the flight-control information.

The imaging controller 264 controls the camera 21 to capture images when receiving the imaging-instruction information from the mobile terminal 1. The imaging controller 264 is configured to store the captured images generated by the camera 21 on the storage 25. The imaging controller 254 may transmit the captured images generated by the camera 21 to the mobile terminal 1.

[Configuration of Operation Management Device 3]

Figure 4:
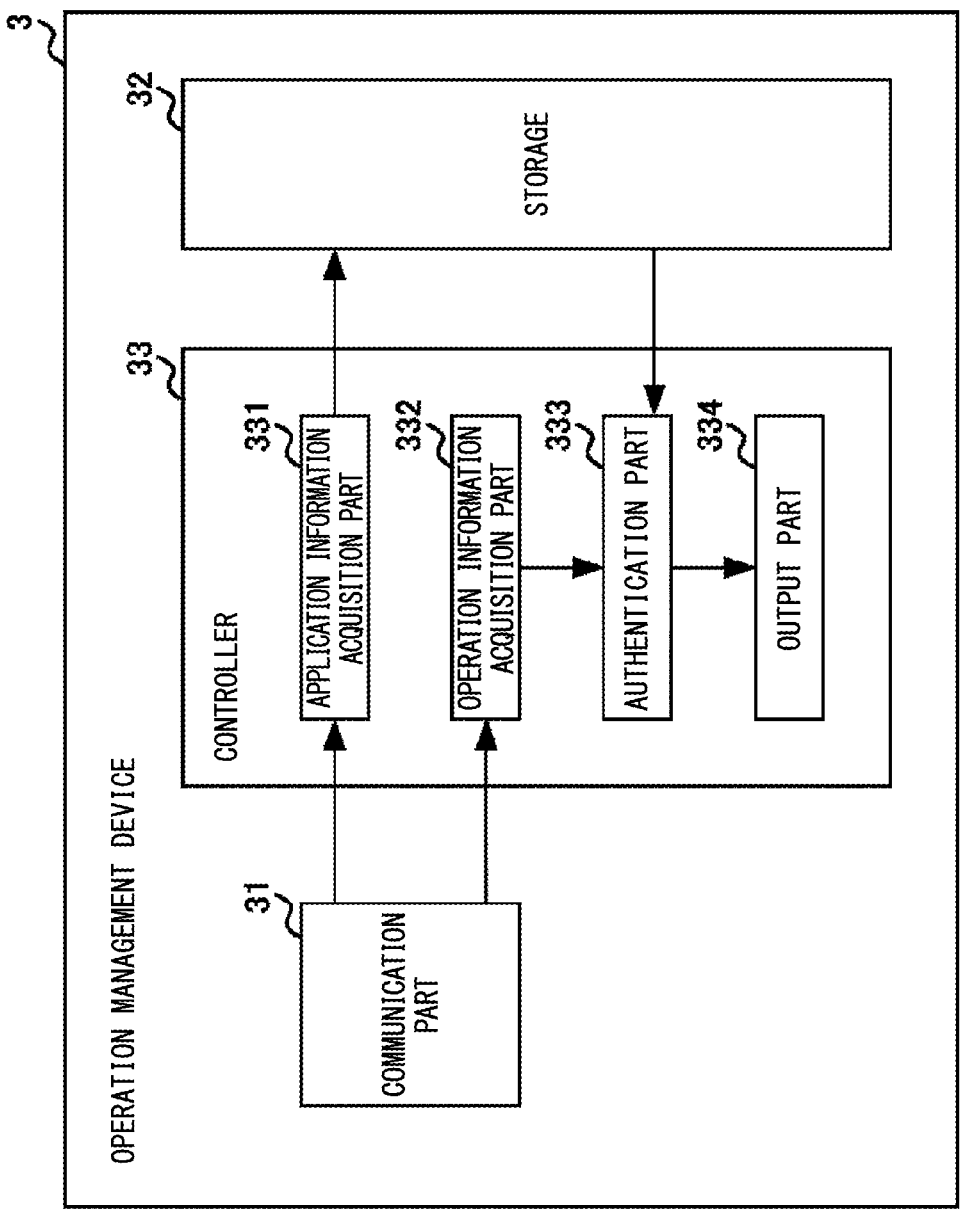
FIG. 4 is a block diagram showing the configuration of an operation management device according to the first embodiment.

FIG. 4 shows the configuration of the operation management device 3 according to the first embodiment. The operation management device 3 includes a communication part 31, a storage 32, and a controller 33.

The communication part 31 is a communication module configured to communicate with external devices. The communication part 31 is configured to communicate with the mobile terminal 1 over wired or wireless communication networks (unillustrated here) as well as the mobile phone line W2. In addition, the communication part 31 is configured to communicate with the management apparatus 4, which is managed by a communication carrier providing services using the mobile phone line W2, over communication networks.

The storage 32 is configured of storage media including a ROM, a RAM, and the like. The storage 32 stores operation management programs to achieve the functions of an application information acquisition part 331, an operation information acquisition part 332 serving as an operation information receiver, an authentication part 333, and an output part 334.

For example, the controller 33 is configured of a CPU. The controller 33 executes operation management programs stored on the storage 32 to achieve the functions of the application information acquisition part 331, the operation information acquisition part 332, the authentication part 333, and the output part 334.

The application information acquisition part 331 is configured to receive the flight application information representing a flight application of the flight device 2 from the mobile terminal 1. The application information acquisition part 331 receives and stores the flight application information on the storage 32. The operation information acquisition part 332 is configured to receive the operation information from the mobile terminal 1 at a flight-start time of the flight device 2 and during a flight time of the flight device 2.

The authentication part 333 is configured to authenticate the flight device 2 as to whether or not the operation information received from the mobile terminal 1 matches the flight application information stored on the storage 32 at a flight-start time of the flight device 2 and during a flight time of the flight device 2.

Specifically, the authentication part 333 receives the operation information from the mobile terminal 1 at a flight-start time of the flight device 2 and during a flight time of the flight device 2. The authentication part 333 determines the subscriber ID included in the operation information, the device ID of the flight device 2, and the flight application information including the current date/time (e.g. present date) with reference to the storage 32. Upon successfully determining the flight application information, the authentication part 333 determines whether or not the position of the flight device 2 indicated by the position information included in the operation information belongs to a flight area indicated by the information representing a flight area of the flight device 2 according to the flight application information. At a flight-start time of the flight device 2, the authentication part 333 determines whether or not the position of the flight device 2 indicated by the position information belongs to a flight area of the flight device 2 by determining whether or not the position of the flight device 2 falls within a certain range of distance departing from the location corresponding to a flight-start point included in the flight application information. During a flight time of the flight device 2, the authentication part 333 authenticates the flight device 2 as to whether or not the position of the flight device 2 indicated by the position information belongs to a flight area of the flight device 2 by determining whether or not the position of the flight device 2 falls within a certain range of distance departing from a flight route (including a flight-schedule position) included in the flight application information at a position-information acquiring time.

The authentication part 333 determines a success of authentication when determining that the position of the flight device 2 indicated by the position information included in the operation infoimation belongs to the flight area of the flight device 2. Upon determining a success of authentication, the authentication part 333 transmits the flight-permit information to permit a flight of the flight device 2 to the mobile terminal 1.

The authentication part 333 determines a failure of authentication when failing to determine the flight application information or when the position of the flight device 2 indicated by the position information included in the operation information does not belong to the flight area according to the flight application information. Upon determining a failure of authentication, the authentication part 333 transmits the error information, which indicates that the flight device 2 is not flying according to a flight application, to the mobile terminal 1.

When the authentication part 333 determines a failure of authentication, the output part 334 transmits to the management apparatus 4 a subscriber-information acquisition request which includes the subscriber ID received from the mobile terminal 1 and which requests to acquire the subscriber-related information (or subscriber information).

For example, the management apparatus 4 stores the contract information representing the content of a contract with a subscriber in connection with the subscriber ID. The contract content includes the information representing the name of a subscriber and the contact address of a subscriber (e.g. a telephone number or an email address). Upon receiving the subscriber-information acquisition request from the operation management device 3, the management apparatus 4 determines the contract content associated with the subscriber ID included in the subscriber-information acquisition request. Subsequently, the management apparatus 4 acquires the subscriber information, i.e. the information representing the name of a subscriber and the contact address of a subscriber included in the contract content. Thus, the management apparatus 4 transmits the subscriber information to the operation management device 3.

The output part 334 receives the subscriber information corresponding to the subscriber ID from the management apparatus 4. The output part 334 outputs the alarm information, which includes the subscriber information and the information indicating that the subscriber is going to fly the flight device 2 not in compliance with a flight application, to a management terminal (unillustrated here) administered by an operation manager. Accordingly, an operation manager is able to recognize an event in which the subscriber is going to fly the flight device 2 without filing a flight application and to thereby take any countermeasures such as a contact with the subscriber.

[Flow of Processing for Flight Application of Flight Device 2]

Figure 5:
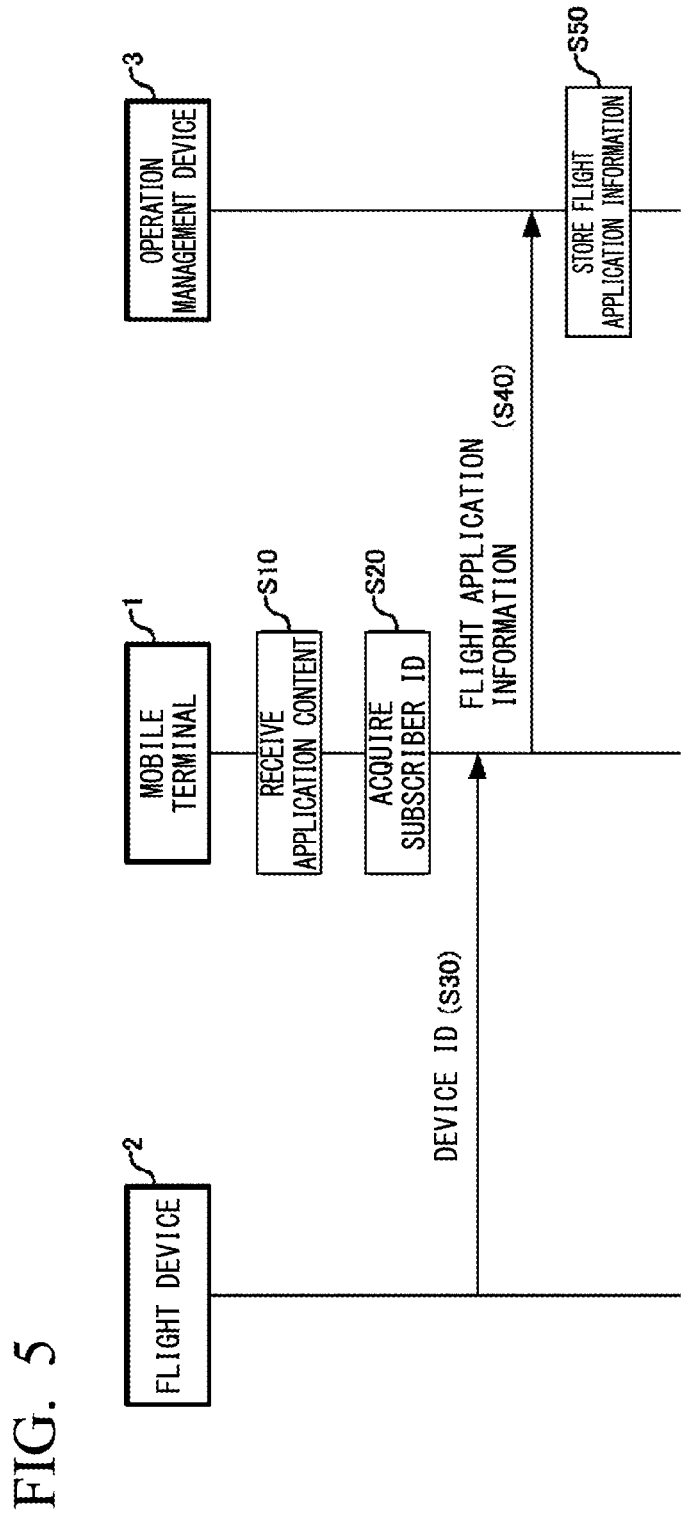
FIG. 5 is a sequence diagram showing a flow of processing for a flight application of the flight device according to the first embodiment.

Next, a flow of processing will be described with respect to a flight application of the flight device 2. FIG. 5 is a sequence diagram showing a flow of processing with respect to a flight application of the flight device 2 according to the first embodiment.

First, the flight application part 172 receives the information representing the content of a flight application of the flight device 2 from a user of the mobile terminal 1 (S10).

Subsequently, the flight application part 172 controls the acquisition part 171 to acquire a subscriber ID and a device ID (S20, S30).

Next, the flight application part 172 transmits the flight-application information including the subscriber ID, the device ID, and the information of the flight content to the operation management device 3 (S40).

Subsequently, the application information acquisition part 331 of the operation management device 3 receives the flight application information representing the flight application of the flight device 2 from the mobile terminal 1, thus storing the flight application information on the storage 32 (S50).

[Flow of Processing at Flight-Start Time of Flight Device and During Flight Time of Flight Device 2]

Figure 6:
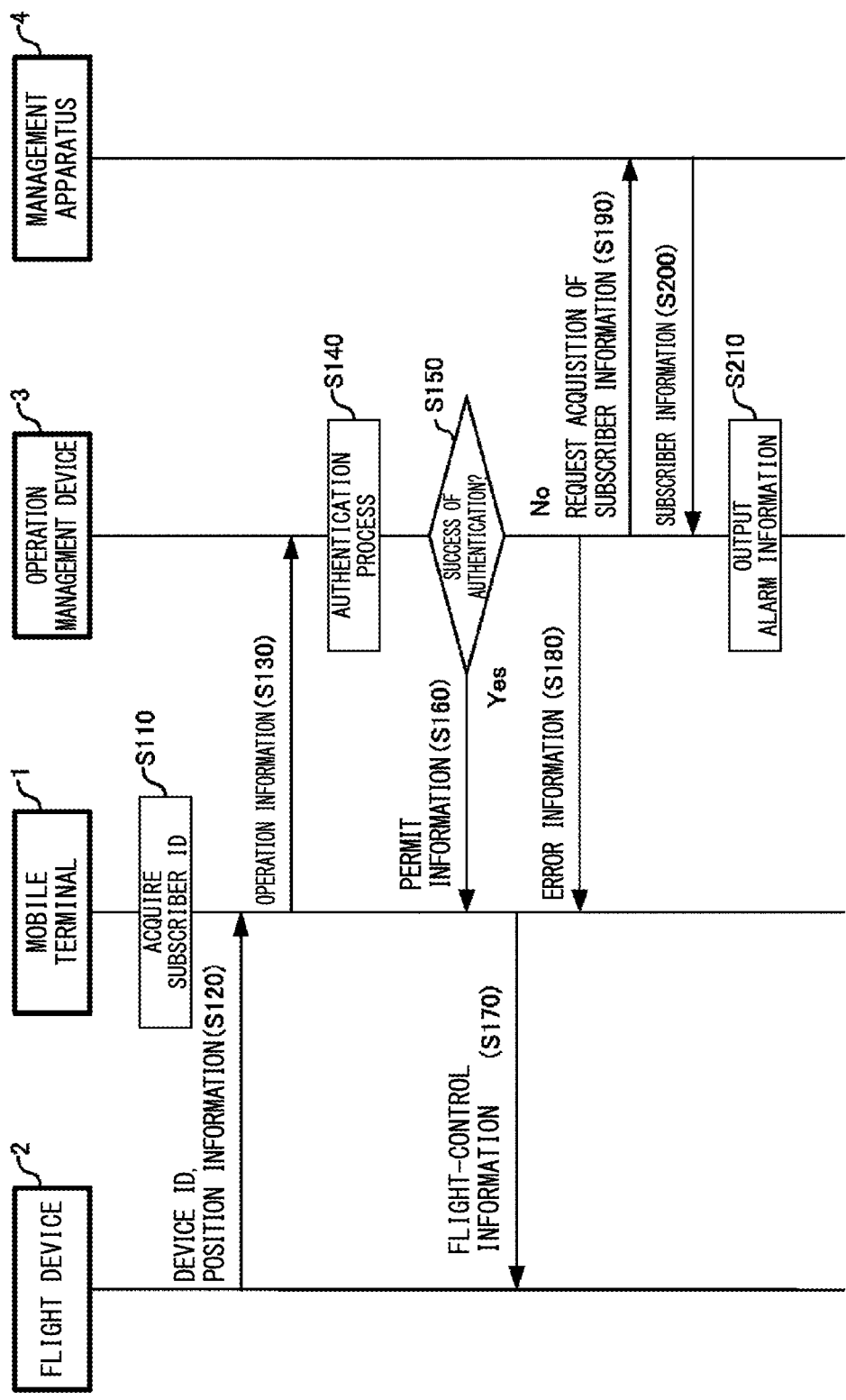
FIG. 6 is a sequence diagram showing a flow of processing for a flight start time of the flight device and a flight time of the flight device according to the first embodiment.

Next, a flow of processing will be described with respect to a flight-start time of the flight device 2 and a flight time of the flight device 2. FIG. 6 is a sequence diagram showing a flow of processing at a flight-start time of the flight device 2 and during a flight time of the flight device 2 according to the first embodiment. The flow of processing shown in FIG. 6 will be repeatedly executed until the end of a flight of the flight device 2.

First, the operation infoimation transmitter 173 acquires a subscriber ID stored on the SIM card 151 (S110).

Subsequently, the operation information transmitter 173 acquires a device ID to identify the flight device 2 and the position information representing the position of the flight device 2 from the flight device 2 (S120).

The operation information transmitter 173 transmits the operation information including the subscriber ID, the device ID, and the position information to the operation management device 3 (S130).

Upon receiving the operation information from the mobile terminal 1, the authentication part 333 of the operation management device 3 carries out an authentication process as to whether or not the operation information complies with the flight application information which was received from the mobile terminal 1 in advance and stored on the storage 32 (S140).

The authentication part 333 determines whether an authentication is carried out successfully (S150). Upon determining a success of authentication, the authentication part 333 transmits the flight-permit information to permit a flight of the flight device 2 to the mobile terminal 1 (S160). The device controller 174 carries out a flight control over the flight device 2 when the mobile terminal 1 receives the flight-permit information from the operation management device 3 (S170). In this connection, the mobile terminal 1 starts a flight of the flight device 2 once it receives the flight-permit information, and therefore the authentication part 333 may not need to retransmit the flight-permit information.

Upon determining a failure of authentication, the authentication part 333 transmits the error information representing a flight not complied with a flight application to the mobile terminal 1 (S180). The operation information, transmitter 173 of the mobile terminal 1 displays the error information on the display 13.

When the authentication part 333 determines a failure of authentication, the output part 335 transmits a subscriber information acquisition request to the management apparatus 4 (S190), thus receiving the subscriber information from the management apparatus 4 (S200).

The output part 334 outputs the alarm information, which includes the subscriber information and the information indicating that the flight device 2 is going to fly without compliance with a flight application, to a management terminal administered by an operation manager (S210).

Effect of First Embodiment

As described above, the mobile terminal 1 of the first embodiment acquires the subscriber ID to identify a subscriber joining services using the mobile telephone line W2 from the SIM card 151 mounted on the mobile terminal 1 while acquiring the position information representing the position of the flight device 2 and the device ID to identify the flight device 2. Subsequently, the mobile terminal 1 transmits the operation information including the subscriber ID, the position information, and the device ID to the operation management device 3. Accordingly, the operation management device 3 is able to carry out an operation management by acquiring the position information and the device ID of the flight device 2 during a flight time of the flight device 2.

At a time to file a flight application, the mobile terminal 1 acquires the information representing the flight content as well as the subscriber ID and the device ID. Subsequently, the mobile terminal 1 transmits the flight application information representing a flight application of the flight device 2, which further includes the flight-content information, the subscriber ID, and the device ID, to the operation management device 3 configured to manage the operation of the flight device 2 over the mobile telephone line W2. Conventionally, it is required to input the name of a flight applicant and its address when filing a flight application, which may raise a problem such as a troublesome procedure. In contrast, the present embodiment simply requires a user of the mobile terminal 1 to input the flight-content information without requiring an input of the name and the address; hence, it is possible to file a flight application with ease.

The position information and the device ID of the flight device 2 are transmitted to the mobile terminal 1 over the wireless communication line W1 different from the mobile telephone line W2, and therefore the mobile terminal 1 will retransmit the position information and the device ID to the operation management device 3, Accordingly, it is unnecessary for the flight device 2 to transmit the position information and the device ID over the mobile telephone line W2, and therefore it is possible to reduce the cost of the flight device 2 since the flight device 2 does not need to include another communication part in connection with the mobile telephone line W2.

In the first embodiment, the operation information includes the subscriber ID, the device ID, and the position information; but this is not a restriction. In this connection, the operation information may include the device ID and the position information but preclude the subscriber ID. In this case, when the authentication part 333 determines a failure of authentication, the output part 334 may receive the subscriber information from the management apparatus 4 according to the subscriber ID included in the flight application information, thus outputting the alarm information, which includes the subscriber information and the information indicating that the flight device 2 is going to fly without compliance with a flight application, to a management terminal administered by an operation manager.

Second Embodiment

[Transmission of Operation Information of Multiple Flight Devices 2 to Operation Management Device 3]

Next, the second embodiment will be described. The operation management system S of the second embodiment differs from the first embodiment in such a way that a user of the mobile terminal 1 possesses a plurality of flight devices 2 and may concurrently fly a plurality of flight devices 2. Hereinafter, the second embodiment will be described with respect to the operation management system 2. In this connection, descriptions relating to the parts identical to those of the first embodiment will be omitted here.

The flight application part 172 of the mobile terminal 1 receives the information representing the content of flight applications for a plurality of flight devices 2 from a user of the mobile terminal 1 and thereby transmits the flight application information, corresponding to each of multiple flight devices 2, to the operation management device 3 via the second communication part 12.

The application information acquisition part 331 of the operation management device 3 receives the flight application information for each of multiple flight devices 2 from the mobile terminal 1. The application information acquisition part 331 receives and stores the flight application information on the storage 32.

The operation information transmitter 173 of the mobile terminal 1 controls the acquisition part 171 to acquire the position information representing the position of each of multiple flight devices 2 and the device ID for each of multiple flight devices 2 over the wireless communication line W1.

The operation information transmitter 173 controls the acquisition part 171 to acquire the subscriber ID stored on the SIM card 151. The operation management transmitter 173 transmits the operation information, which includes the subscriber ID, the device ID and the position information for each of multiple flight devices 2, to the operation management device 3 over the mobile telephone line W2.

The authentication part 333 of the operation management device 3 authenticates each of multiple flight devices 2 as to whether or not the operation information received from the mobile terminal 1 complies with the flight application information stored on the storage 32.

Effect of Second Embodiment

As described above, the mobile terminal 1 of the second embodiment acquires the subscriber ID stored, on the SIM card 151 as well as the position information representing the position of each flight device 2 and the device ID to identify each flight device 2 with respect to each of multiple flight, devices 2 over the wireless communication line W1. Subsequently, the mobile terminal 1 transmits the operation information, which includes a single subscriber ID as well as the position information and the device ID for each of multiple flight devices 2, to the operation management device 3 over the mobile telephone line W2.

As described above, the mobile terminal 1 is configured to receive the position information and the device ID for each of multiple flight devices 2 over the wireless communication line W1, and therefore the mobile terminal 1 does not need to include a communication part configured to communicate with each of multiple flight devices 2 over the mobile telephone line W2. Therefore, it is possible for a user to reduce the operation cost for multiple flight devices 2. In addition, it is possible for the mobile terminal 1 to reduce loads to the mobile telephone line W2 in comparison with a mobile terminal including a communication part configured to communicate with each of multiple flight devices 2 over the mobile telephone line W2 and to thereby receive the position information and the device ID for each of multiple flight devices 2 over the mobile telephone line W2.

Third Embodiment

[Flight Device 2 to Transmit Operation Information to Operation Management Device 3]

Next, the third embodiment will be described. The operation management system S of the third embodiment differs from the first embodiment in such a way that the flight device 2 is configured to transmit the operation information to the operation management device 3 when it cannot communicate with the mobile terminal 1 over the wireless communication line W1. Hereinafter, the third embodiment will be described with respect to the operation management system S.

Figure 7:
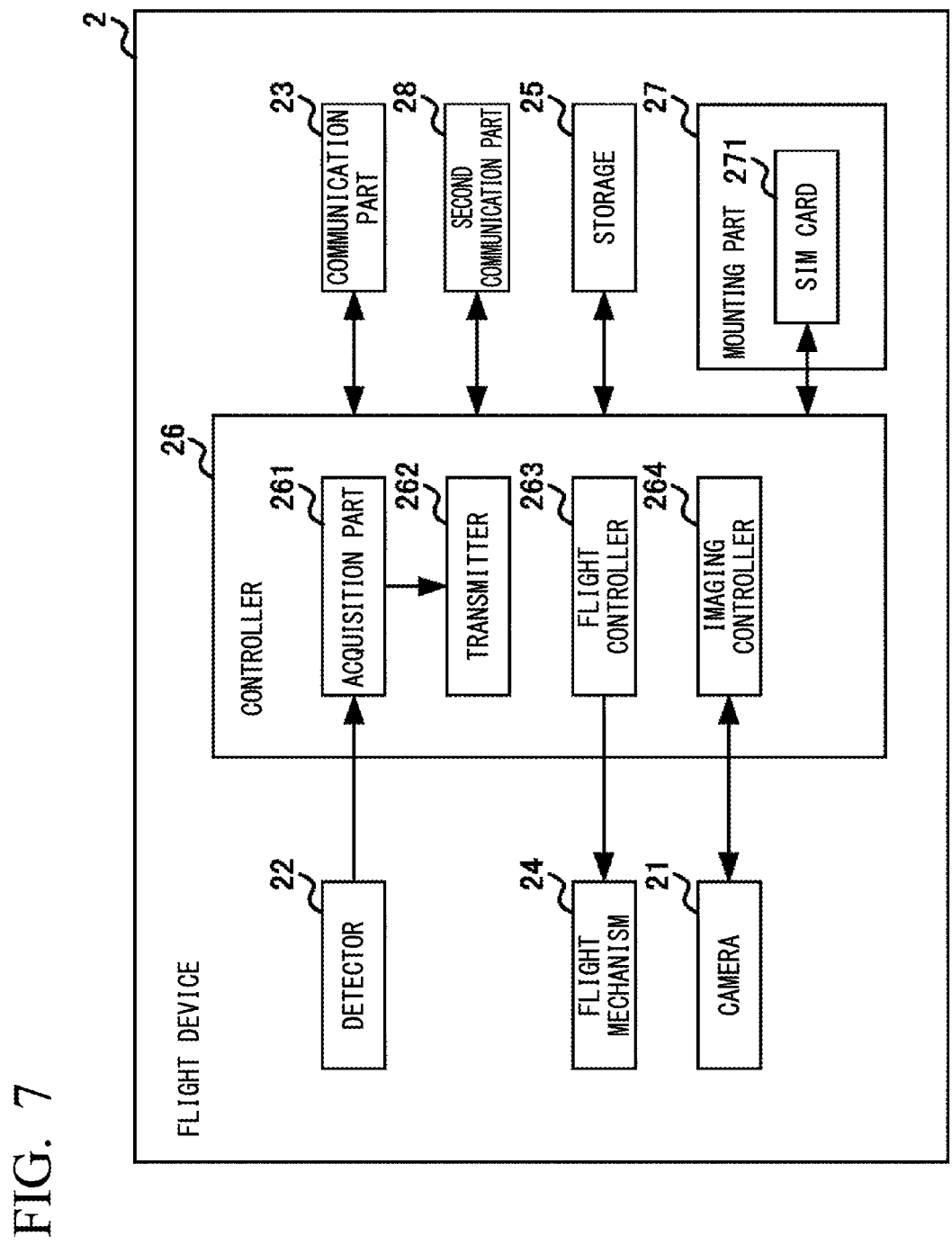
FIG. 7 is a block diagram showing the configuration of a flight device according to the third embodiment.

FIG. 7 shows the configuration of the flight device 2 according to the third embodiment. As shown in FIG. 7, the flight device 2 further includes a mounting part 27 and a second communication part 28.

The mounting part 27 is used to mount a SIM card 271. The information stored on the SIM card 271 mounted on the mounting part 27 is read by the controller 26 and used for communication with the second communication part 28.

The second communication part 28 is a communication module configured to receive or transmit radio waves used for a communication over the mobile telephone line W2, wherein the second communication part 28 has the same function as the second communication part 12 of the mobile terminal 1.

In the third embodiment, the acquisition part 261 is configured to acquire a subscriber ID stored on the SIM card 151, which is mounted on the mobile terminal 1, from the mobile teminal 1. The acquisition part 261 acquires and stores the subscriber ID on the storage 25.

When the transmitter 262 is able to communicate with the mobile terminal 1 over the wireless communication line W1, the transmitter 262 transmits the position information representing the position of the flight device 2 and the device ID to identify the flight device 2 to the mobile terminal 1 every predetermined time over the wireless communication line W1.

When the transmitter 262 fails to communicate with the mobile terminal 1 over the wireless communication line W1, the transmitter 262 controls the acquisition part 261 to acquire the subscriber ID corresponding to the SIM card 151 stored on the storage 25. Subsequently, the transmitter 262 transmits the operation information, which includes the subscriber ID, the position information, and the device ID, to the operation management device 3 over the mobile telephone line W2.

Upon receiving the operation information from the flight device 2, the operation management device 3 carries out an authentication process similar to the situation in which it receives the operation information from the mobile terminal 1.

Effect of Third Embodiment

As described above, the flight device 2 of the third embodiment transmits the operation information to the operation management device 3 over the mobile telephone line W2 when it fails to communicate with the mobile terminal 1 over the wireless communication line W1. Accordingly, even when the flight device 2 is unable to communicate with the mobile terminal 1 over the wireless communication line W1, the flight device 2 is able to directly transmit the operation information, which includes the subscriber ID used of an authentication process, to the operation management device 3. For this reason, it is possible for the operation management device 3 to continue an authentication process even when both the flight device 2 and the mobile terminal 1 cannot communicate with each other over the wireless communication line W1.

Fourth Embodiment

[Payment of Insurance Contract for Flight of Flight Device]

Next, the fourth embodiment will be described. The operation management system S of the fourth embodiment differs from the first embodiment in terms of the payment of an insurance contract and a flight-route usage fee for a flight of the flight device 2. Hereinafter, the fourth embodiment will be described with reference to the operation management system S.

FIG. 8 shows the outline of the operation management system S according to the fourth embodiment.

As shown in FIG. 8, the operation management system S carries out a communication with a charging management apparatus 5, e.g. an insurance management apparatus managed by an insurance company.

In the fourth embodiment, the flight application part 172 receives an application of an insurance contract for a flight of the flight device 2 when filing a flight application of the flight device 2. Upon receiving an insurance-contract application, the flight application part 172 transmits the contract application information representing the insurance-contract application, which includes a subscriber ID and a device ID to identify the flight device 2, to the payment management apparatus 5.

The charging management apparatus 5 receives an insurance contract for a flight of the flight device 2. Upon receiving the contract application information from the mobile terminal 1, the charging management apparatus 5 charges a subscriber having the subscriber ID included in the contract application information for an insurance contract. For example, the charging management apparatus 5 has stored the premium information including a device ID of the flight device 2, a type of the flight device 2, a flight route, and a premium in advance. Upon receiving the contract application information from the mobile terminal 1. the charging management apparatus 5 acquires the flight application information corresponding to the subscriber ID included in the contract application information from the operation management device 3. The charging management apparatus 5 determines the premium associated with the device ID included in the contract application information. The charging management apparatus 5 charges the subscriber for the premium based on the subscriber ID included in the contract application information.

For example, the charging management apparatus 5 transmits a charging request including the subscriber ID and the premium information to the management apparatus 4 managed by a communication carrier providing services using the mobile telephone line W2. Upon receiving the charging request, the management apparatus 4 generates the charging infoiiiiation for the subscriber ID included in the charging request. Subsequently, the management apparatus 4 claims a premium for an insurance contract when charging a usage fee for the mobile telephone line W2 against the subscriber having the subscriber ID. In addition, the management apparatus 4 carries out a process to pay a premium of an insurance contract with an insurance company.

In the above, the charging management apparatus 5 is configured to receive the contact application information from the mobile terminal 1; but this is not a restriction. For example, the charging management apparatus 5 may charge a premium when acquiring the flight application information. In this case, upon receiving the flight application information, the operation management device 3 transmits the flight application information including the subscriber ID to the charging management apparatus 5 in order to charge a subscriber having the subscriber ID included in the flight application information for a flight of the flight device 2. The charging management apparatus 5 determines the premium based on the flight application information and the premium information stored on its storage. The charging management apparatus 5 charges a subscriber having the subscriber ID included in the flight application information for the premium determined above. In addition, the charging management apparatus 5 may charge a premium at a timing of receiving the operation information from the operation management device 3 when the flight device 2 starts to fly in the air.

The charging management apparatus 5 may charge a flight-route usage fee. For example, the charging management apparatus 5 stores a flight-route usage fee in connection with a flight route. The charging management apparatus 5 receives the flight application information from the operation management device 3 so as to determine a flight route indicated by a flight area included in the flight application information. When the flight-route usage fee has been set with respect to the flight route, the charging management apparatus 5 may charge a subscriber having the subscriber ID included in the flight application information for the flight-route usage fee. Herein, the charging management apparatus 5 may charge the flight-route usage fee at a time of filing a flight application or after a flight of the flight device 2.

Effect of Fourth Embodiment

As described above, the mobile terminal 1 of the fourth embodiment transmits the contract application information representing an insurance-contract application for a flight of the flight device 2, which includes the subscriber ID and the device ID, to the charging management apparatus 5 managed by an insurance company concluding an insurance contract. Subsequently, the charging management apparatus 5 charges a premium of an insurance contract according to the subscriber ID included in the contract application information. Accordingly, it is possible for a user of the mobile terminal 1 to make an insurance contract for a flight of the flight device 2 with ease.

Heretofore, the present invention has been described in conjunction with the embodiments, but the technical scope of the present invention is not necessarily limited to the scope of the descriptions about the foregoing embodiments. It would be obvious for a skilled person in the art to make various changes or modifications with the foregoing embodiments. In particular, it is possible to provide concrete examples to diversify or integrate the foregoing devices, which are not necessarily limited in the above-illustrated manners; hence, the foregoing devices can be entirely or partly diversified or integrated in terms of their functionality or physical property in arbitrary units depending on various additions or functional loads.

REFERENCE SIGNS LIST 1 mobile terminal
11 first communication part
12 second communication part
13 display
14 operation part
15 mounting part
16 storage
17 controller
151 SIM card
171 acquisition part
172 flight application part
173 operation information transmitter
174 device controller
2 flight device
21 camera
22 detector
23 communication part
24 flight mechanism
25 storage
26 controller
261 acquisition part
262 transmitter
263 flight controller
264 imaging controller
3 operation management device
31 communication part
32 storage
33 controller
331 application information acquisition part
332 operation information acquisition part
333 authentication part
334 output part
4 management apparatus
5 charging management apparatus
W1 wireless communication line
W2 mobile telephone line
S operation management system

The invention claimed is:

1. An operation management method adapted to an operation management device configured to manage an operation of a flight device to be controlled by a communication terminal which is linked with the flight device over a wireless communication line using unlicensed bands and which is linked with the operation management device over a mobile telephone line using licensed bands for a subscriber having subscriber identification information, the method comprising:

acquiring, from the communication terminal over the mobile telephone line different from the wireless communication line, flight application information including the subscriber identification information to identify the subscriber to the mobile telephone line, flight-device identification information to identify the flight device, and a flight area for the flight device to fly which is defined by a flight-start position and a destination of the flight device, or a flight route of the flight device;

acquiring, from the communication terminal over the mobile telephone line, operation information including the subscriber identification information, the flight-device identification information, and position information of the flight device which is detected by the flight device and which the communication terminal acquires from the flight device during flight over the wireless communication line different from the mobile telephone line; and performing an authentication as to whether the operation information complies with the flight application information upon determining whether the position information of the flight device be included in the flight area for the flight device covering the flight-start position of the flight device before flight or the flight route of the flight device during flight, thus implementing (i) or (ii), (i) upon successful authentication, sending permit information to permit the flight of the flight device to the communication terminal, (ii) upon failed authentication, sending error information to the communication terminal, thus displaying the error information on the communication terminal.

2. The operation management method according to claim 1, further comprising:

storing, the flight application information representing a flight application of the flight device on a storage before acquiring the subscriber identification information, the position information, and the flight-device identification information from the communication terminal, wherein the flight application information includes information indicating a flight date and time in association with the flight area of the flight device.

3. An operation management device configured to manage an operation of a flight device to be controlled by a communication terminal which is linked with the flight device over a wireless communication line using unlicensed bands and which is liked with the operation management device over a mobile telephone line using licensed bands for a subscriber having subscriber identification information, the operation management device comprising a memory configured to store instructions and a processor configured to execute the instructions to:

acquire from the communication terminal over the mobile telephone line, flight application information including the subscriber identification information to identify the subscriber to the mobile telephone line, flight-device identification information to identify the flight device, and a flight area for the flight device to fly which is defined by a flight-start position and a destination of the flight device, or a flight route of the flight device;

acquire from the communication terminal over the mobile telephone line, operation information including the subscriber identification information, the flight-device identification information, and position information of the flight device which is detected by the flight device and which the communication terminal acquires from the flight device during flight over the wireless communication line different from the mobile telephone line; and perform an authentication as to whether the operation information complies with the flight application information upon determining whether the position information of the flight device be included in the flight area for the flight device covering the flight-start position of the flight device before flight or the flight route of the flight during flight, thus implementing (i) or (ii),
- (i) upon successful authentication, sending permit information to permit the flight of the flight device to the communication terminal,
- (ii) upon failed authentication, sending error information to the communication terminal, thus displaying the error information on the communication terminal.

4. The operation management device according to claim 3, wherein the processor is further configured to store on a storage the flight application information representing a flight application of the flight device before acquiring the subscriber identification information, the position information, and the flight-device identification information from the communication terminal, wherein the flight application information includes information indicating a flight date and time in association with the flight area of the flight device.

* * * * *